Feb. 8, 1966 T. F. MILLS 3,234,334

FM STEREO-MULTIPLEX RECEIVING SYSTEM

Filed Dec. 14, 1962 2 Sheets-Sheet 1

INVENTOR.
THOMAS F. MILLS
BY
Wolfenstein Spangenberg & Hattis
ATTYS.

Feb. 8, 1966 T. F. MILLS 3,234,334

FM STEREO-MULTIPLEX RECEIVING SYSTEM

Filed Dec. 14, 1962 2 Sheets-Sheet 2

INVENTOR.
THOMAS F. MILLS
BY
Wallenstein, Spangenberg & Hattis
ATTYS.

United States Patent Office 3,234,334
Patented Feb. 8, 1966

3,234,334

FM STEREO-MULTIPLEX RECEIVING SYSTEM

Thomas Frederick Mills, Chicago, Ill., assignor to Sherwood Electronic Laboratories, Inc., Chicago, Ill., a corporation of Illinois Filed Dec. 14, 1962, Ser. No. 244,748
5 Claims. (Cl. 179—15)

This invention relates to a receiving system which distinguishes between the reception of signals from stations transmitting special station identifying signals and signals from other stations not transmitting such special signals. Many aspects of the invention relate specifically to or have their most important application in FM stereo-multiplex receiving systems, although other aspects thereof have a broader application.

In recent years, a frequency modulation (FM) multiplex transmission system has been developed for transmitting stereophonic sound signals on a single FM carrier. In its most common form, the FM carrier is modulated by an amplitude modulated (AM) suppressed carrier waveform which incorporates both stereophonic signals. The technique for separating the two stereophonic signal components in the receiver require, among other things, the addition to the AM suppressed carrier wave form of the carrier frequency (sometimes referred to as the sub-carrier frequency) and, to this end, the FM stereo-multiplex station involved transmits as a modulation on the FM carrier a synchronizing signal which is generally at a subharmonic frequency of the AM carrier frequency. The resultant AM waveform has an upper envelope which duplicates one of the stereophonic signals and a lower envelope which duplicates the other stereophonic signal. A pair of detecting circuits are provided for detecting and separating out the upper and lower envelope waveforms. The separated stereophonic signals are than fed through separate audio amplifier channels to their respective speakers for duplicating the stereophonic sound involved.

The Federal Communications Commission has established standards for the AM carrier and synchronizing signal frequencies to simplify and standardize the stereo-multiplex receiver equipment. To this end, the AM sub-carrier frequency has been established at 38 kc. with a side band deviation of plus or minus 15 kc. The synchronizing signal frequency has been set at 19 kc.

The equipment making up a receiving system includes a conventional FM tuner and stereo-amplifier circuit and an adapter circuit which is connected between the tuner and amplifier circuit. The reception of FM stereo-multiplex signals requires the bypassing of the de-emphasis network commonly incorporated in the receiving equipment. Although the regular FM station signals pass through the adapted circuit and reach both speakers, the bypassing of the de-emphasis network increases the noise level. It is, therefore, desirable to bypass the FM stereo-multiplex circuit when receiving ordinary FM signals. Suitable switch controls are provided for this purpose.

The FM tuner, adapted and stereo-amplifier components are physically located at any convenient location in the room involved. Unless the tuner happens to be located near a line passing midway between the speakers, it is usually difficult for the operator in the process of operating the tuning controls to distinguish between stereophonic and monophonic sound even when there is good signal separation. Also, the recognition of most stereophonic sound signals requires appreciable concentration of the listener even when he is properly positioned between the speakers. It is thus desirable for the user of FM stereo-multiplex equipment to have a reliable and convenient means for readily determining when an FM stereo-multiplex station is being tuned-in. To this end, it has been common practice to incorporate in each FM stereo-multiplex receiving system a stereo-light which lights up when an FM stereo-multiplex signal is being received and hopefully remains unlit when tuning between stations as well as when receiving an ordinary FM station. (The lighting of the stereo-light when tuning between stations may lead the operator into believing that an FM stereo-multiplex station is being received but, due to defect in the output stages of the equipment, is not reaching the speakers.)

Unfortunately, the technique heretofore developed for operating the stereo-light frequently have been unsatisfactory because they are unreliable under various conditions which cause a steady or flickering light between stations or when receiving non-stereo-multiplex stations. Some of the more reliable techniques heretofore developed for controlling the stereo-light require relatively complex control circuitry which significantly increases the cost of the receiving equipment.

All of these techniques for controlling the stereo-light presently in use utilize the 19 kc. synchronizing signal referred to above to effect lighting of the stereo-light. As is well known, when an FM receiver is tuned between FM stations, the noise level in the receiver is quite high, and when the receiver is tuned to an FM station the noise level becomes substantially reduced due to the fact that the noise rides upon the incoming signal where it is removed by various clipping or limiter circuits commonly provide in the FM tuner. When the FM tuner is tuned between stations the high amplitude noise signals can produce 19 kc. signals in the receiver which develop sufficient voltage levels to turn on the stereo-light. This problem has been overcome in some of the prior FM stereo-multiplex receiving systems by providing a separate noise pickup channel which is sensitive to noise signals in a wide frequency band above the modulating frequencies of the FM stations. A control signal is developed from the wide band of noise present only when the FM tuner is tuned between stations, which control signal is utilized to prevent the energization of the stereo-light.

When an ordinary FM station is being received, there will normally be no 19 kc. frequency signals present to light the stereo-light, and no noise signals to turn the stereo-light off. This problem is met by normally biasing the stereo-light off.

The separate noise channel referred to requires a relatively large number of additional components and so substantially increases the cost of manufacture of the receiving equipment. Also, due to the principle of operation of the stereo-light control circuit, interfering signals close to 19 kc. transmitted by some non-stereo-multiplex stations or generated by local electrical equipment often create false stereo-light indications.

It is, accordingly, an object of the invention to provide a receiving system which provides a reliable, unambiguous response to the reception of special control signals under practically all operating conditions of the system. A more specific object of the invention is to provide an FM stereo-multiplex receiving system with a stereo-light control circuit which is substantially more reliable in operation than the control circuits heretofore developed. A related object of the invention is to provide a reliable stereo-multiplex receiving system with a stereo-light control circuit which requires a minimum of parts.

The present invention overcomes the problems referred to above in an exceedingly simple and inexpensive way. Instead of utilizing a separate wide band noise pickup channel, a simple inhibit circuit is provided forming part of the 19 kc. signal detecting circuit, which inhibit circuit distinguishes between a 19 kc. synchronizing signal from an FM stereo-multiplex station and a noise induced 19 kc. signal. The inhibit circuit develops a control voltage only for the latter 19 kc. signal, which voltage inhibits the turning on of the stereo-light. It was discovered that, while the 19 kc. synchronizing signals have a constant amplitude, the noise induced 19 kc. signals are amplitude modulated due to the random nature of the noise. The 19 kc. signals are fed through a detector circuit which demodulates the signal to produce a steady direct current (D.C.) control voltage for the constant amplitude signal and a varying amplitude D.C. control voltage for the noise induced 19 kc. signal, both of which would be effective in the absence of an inhibiting or opposing voltage to turn on the stereo-light.

The inhibit circuit referred to most advantageously includes a capacitor or tuned circuit tuned to 19 kc. which effectively blocks D.C. or absorbs completely any constant amplitude 19 kc. voltage, and a clamping rectifier and load impedance across which the amplitude varying component of the noise induced 19 kc. signal appears as a varying amplitude D.C. voltage. The latter voltage is fed in voltage opposing relation to the light turn-on control voltage referred to above. The use of the tuned circuit is an especially useful form of the invention because it passes interfering signals having a frequency different from 19 kc., and the passed signal acts like a varying amplitude 19 kc. signal by producing a varying amplitude D.C. inhibiting voltage across the clamping rectifier.

Other aspects of the invention relate to other details of the inhibit circuit which further increase the reliability and sensitivity of the stereo-light control circuit.

For a better understanding of the invention, reference should now be made to the specification to follow, the claims and the drawings wherein:

Figures 1, 2, 3:
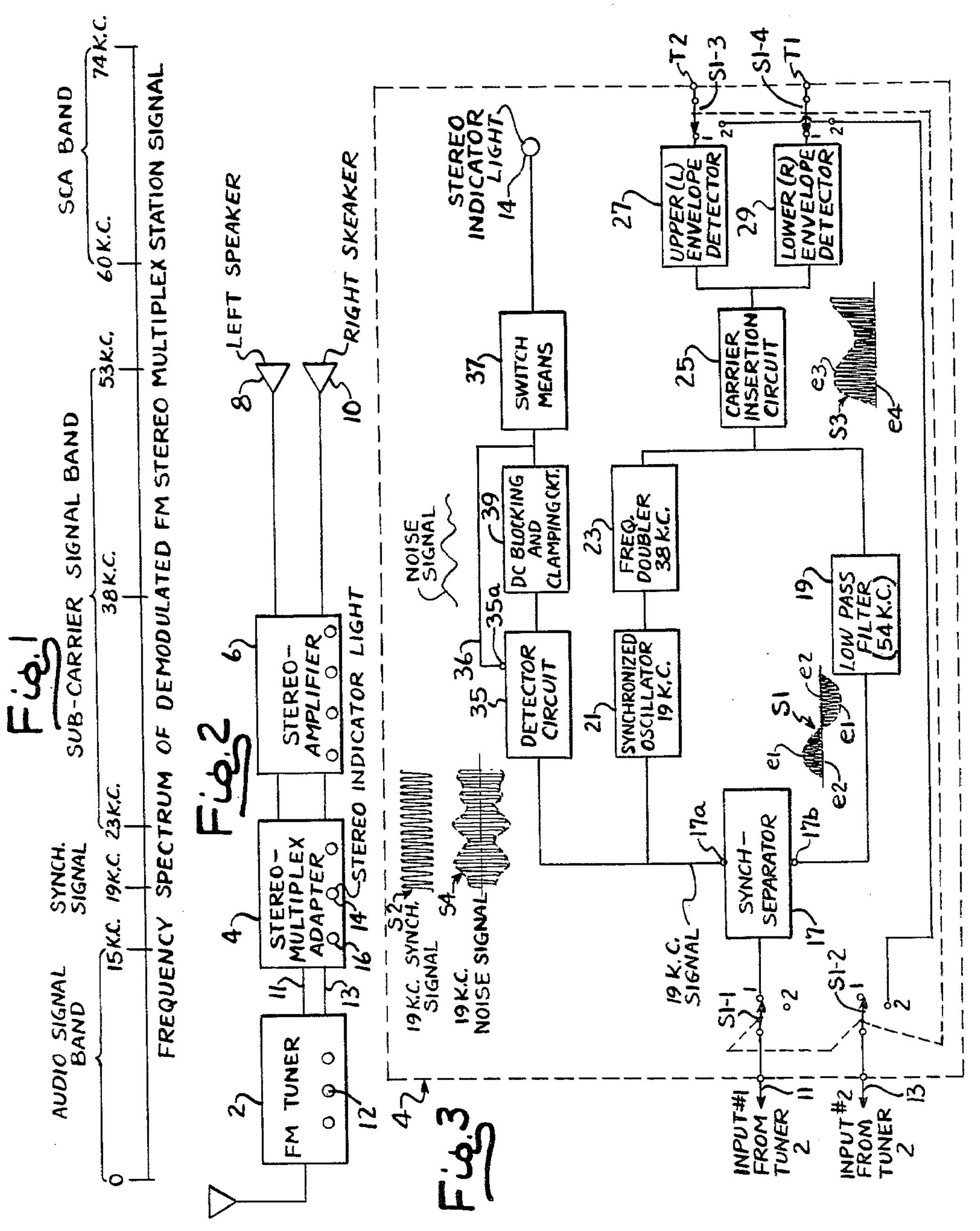
FIG. 1 is a diagram showing the frequency spectrum of a demodulated FM stereo-multiplex signal including an SCA signal.
FIG. 2 is a basic block diagram of a typical FM stereo-multiplex receiving system.
FIG. 3 is a detailed block diagram of an FM stereo-multiplex adapter unit forming part of the system of FIG. 2 and incorporating features of the present invention.

Refer now most particularly to the waveform S1 illustrated in the box diagram of FIG. 3. Waveform S1 is a suppressed carrier AM waveform which constitutes the stereo-multiplex FM carrier signal carrying the stereophonic sound which is transmitted on an FM carrier. For illustrative purposes only and to emphasize an extreme condition requiring maximum signal separation, the waveform S1 shows an example where one of the stereo-signals is a sinusoidal signal following the envelope *e*1 and the other stereo-signal is zero indicated by the horizontal envelope *e*2. It will be noted that the envelopes *e*1 and *e*2 jump from one side of the waveform to another. Such a waveform is obtained by switching between the two audio stereo-signals to be transmitted at a 38 kc. switching rate. The FM carrier is also modulated by a 19 kc. synchronizing signal waveform S2 shown in FIG. 3 and in some instances by an "SCA" (Subsidiary Communications Authority) signal which is a completely separate communication channel carrying background music utilized by business and industrial establishments who obtain special receivers for receiving this signal. FIG. 1 illustrates the frequency spectrum of the stereo-multiplex and SCA signals for the maximum band widths permitted by the FCC for these signals.

Referring to FIG. 2, an FM stereo-multiplex receiving system includes three basic sections or components, namely a tuner 2, stereo-multiplex adapter circuit or unit 4, a two channel stereo-amplifier unit 6, and a pair of speakers 8 and 10 respectively connected to the two outputs of the stereo-amplifier 6. The tuner 2 is normally manufactured as a unit separate from the amplifier 1. The stereo-multiplex circuit 4 may be incorporated in the FM tuner 2 or it may be manufactured as a separate unit connectable by conductors between the tuner 2 and the amplifier 6. The tuner includes a de-emphasis network (not shown) which is bypassed during stereo-multiplex operation of the receiving system. Conductor 11 extending from the tuner connects to a point of the tuner which bypasses the de-emphasis network. For reception of monophonic signals, another conductor 13 extends from a point of the tuner which includes the output of the de-emphasis network. The conductors 11 and 13 extend to a multi-level switch to be described which has a control knob 16 which, in one position thereof, connects the monophonic signal conductor 13 directly to the output of the stereo-multiplex circuit 4 to bypass the same, and, in another position thereof, connects the other conductor 11 to the input of the stereo-multiplex circuit.

The FM tuner 2, of course, includes a tuning control knob 12 by means of which the different FM stations are tuned in. As previously indicated, one of the objects of the invention is to provide control circuitry for a stereo-light which indicates when the receiving system is receiving a stereo-multiplex signal. This light is identified by reference numeral 14 and forms part of the stereo-multiplex circuit 4.

Refer now to FIG. 3 which shows a detailed box diagram of the stereo-multiplex circuit 4. As there shown, the tuner output conductor 11 is connected through a wiper and the No. 1 contact of a level S1–1 of a double-throw switch assembly to the input of a synch-separator circuit 17 which connects with other components of the stereo-multiplex circuit to be described. In position No. 2 of the switch assembly, this circuit is bypassed and monophonic signals are fed directly to the output of this circuit. To this end, the conductor 13 is connected through the wiper and the No. 2 contact of a second level S1–2 of the switch assembly to the No. 2 contacts of the third and fourth levels S1–3 and S1–4 of the switch assembly. The wipers of these switch levels are respectively connected to the output terminals T1 and T2 of the stereo-multiplex circuit.

The tuner output on the conductor 11 represents the unde-emphasized output of a discriminator or ratio detector circuit constituting the demodulated signal components S1 and S2 previously referred to where a stereo-multiplex station is tuned-in, or an ordinary 0 to 15 kc. audio signal when an ordinary FM station is tuned-in. When the FM tuner 2 is not tuned to an FM station, the output of the tuner 2 will comprise a wide band of noise frequencies. The synch-separator circuit 17 separates and feeds any 19 kc. signal (or signal very close to this frequency) fed thereto to an output terminal **17*a* thereof and all other demodulated signal components to an output terminal 17*b* thereof. Where an FM stereo-multiplex signal is being received, the signal waveform S1 will appear at the output terminal 17*b* and the constant amplitude synchronization signal waveform S2 will appear at the output terminal 17*a*. The signal waveform S1 passes through a low pass filter 19** which passes only frequencies below 54 kc. to remove any SCA signal which may accompany the waveform S1.

The 19 kc. signals at the output terminal **17*a* may be fed to a synchronized oscillator 21 which produces a 19 kc. sinusoidal output synchronized with the 19 kc. signal fed thereto. The output of the synchronized oscillator output 21 is fed to a frequency doubler circuit 23 which produces a 38 kc. signal synchronized to the oscillator output. The 38 kc. signal and the suppressed carrier signal fed from the low pass filter 19 are mixed in a carrier insertion circuit 25** which produces an AM signal waveform S3 with an upper envelope *e3* representing one of the stereo-signals and a lower envelope *e4* representing the other stereo-signal. The signal waveform S3 thus produces a distinct separation between the envelopes carrying the stereo-signals.

The AM signal waveform S3 is then fed to the output of a pair of detectors 27 and 29 which respectively respond only to the upper and lower envelopes *e3* and *e4* of the waveform S3, thereby providing right and left audio signal waveforms. The outputs of the detectors 27 and 29 are connected to the No. 1 contacts of the switch levels S1–3 and S1–4 respectively, so that the detected stereo-signals are fed to output terminals T1 and T2 on the No. 1 position of the aforesaid switch assembly. The circuitry for the oscillator 21, frequency doubler circuit 23, carrier insertion circuit 25 and the upper and lower envelope detectors 27 and 29 are well known in the art and will not be further described in this specification.

One of the aspects of the present invention involves the manner in which the 19 kc. signal at the output terminal 17*a* of the synch-separator circuit 17 is utilized to control the stereo-light 14. As previously indicated, when the tuner 2 is not tuned to an FM station the signal at the output terminal 17*a* will be a noise induced 19 kc. signal waveform S4. The synch-separator circuit 17 preferably includes a shock-excitable circuit tuned to 19 kc. which is shock excited by the noise signals to produce a waveform S4 with an envelope corresponding to the instantaneous variations in the amplitude of the noise signals. Noise signals generally have random amplitude characteristics and so the amplitude of these noise signals will vary with time. The noise signals will be absent when the tuner 2 is tuned to an FM station because then the noise signals ride on top of the FM signal and are clipped by the limiter stages commonly incorporated in FM tuner circuits.

The constant amplitude 19 kc. synchronizing signal S2 or the noise modulated signal S4 present at the output terminal 17*a* of the synch-separator circuit is fed to the input of a detector circuit 35 which removes any 19 kc. carrier component. Where the synchronizing signal S2 or the noise induced signal waveform S4 is present, a D.C. voltage appears at an output point 35*a* which voltage may be fed by a conductor 36 to the input of switch means 37. In the absence of any opposing or inhibiting voltage, this D.C. voltage will operate the switch means in a condition which lights the stereo-light 14. Normally, the switch means 37 is in a condition which will effect de-energization of the stereo-light 14. However, an inhibiting or opposing voltage will be selectively generated when a varying amplitude 19 kc. signal is present by a D.C. blocking (or inhibiting) and clamping circuit 39 connected to or forming part of the detector circuit 35. As will appear, the circuit 39 is an exceedingly simple circuit which provides a more reliable control over the stereo-light 14 in comparison with the far more complicated techniques heretofore provided in stereo-multiplex systems. As previously indicated, most of these prior techniques utilized a completely separate wide band noise detecting channel for deriving an inhibiting voltage, whereas the present invention derives the inhibiting voltage from the 19 kc. signal detecting channel. The present invention, in addition to being less complicated, reduces the possibility of false stereo-light indications.

Figure 4:
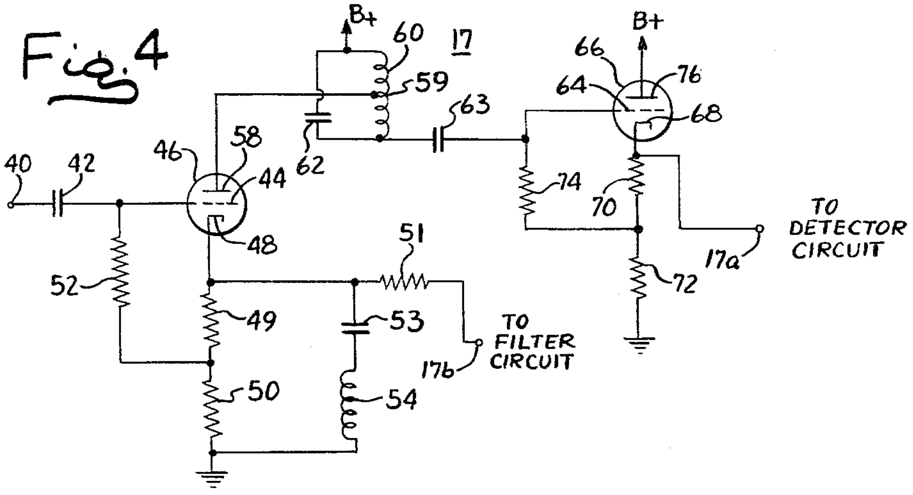
FIG. 4 is a circuit diagram of an exemplary synch-separator circuit forming part of the block diagram of FIG. 3.

Refer now more particularly to FIG. 4 which illustrates an exemplary circuit diagram for the synch-separator circuit 17. The input terminal to this input circuit is identified by reference numeral 40. A capacitor 42 is connected between this input terminal and the control grid 44 of a triode vacuum tube 46. A pair of resistors 49 and 50 are connected in series between the cathode 48 of the triode tube 46 and ground. The aforementioned synch-separator circuit output terminal 17*b* is connected to the cathode 48 through a resistor 51. A resistor 52 is connected between control grid 44 and the juncture of resistors 49 and 50. A series resonant circuit comprising a capacitor 53 and an inductance 54 are connected between the cathode 48 and ground, the resonant circuit being tuned to 19 kc. Thus, 19 kc. frequencies will effectively be bypassed or significantly reduced in the cathode circuit output of the triode tube 46.

The signal at the 19 kc. output terminal 17*a* of the synch-separator circuit is derived from the anode circuit of the triode tube 46. To this end, the anode 58 of the triode tube 46 is connected to a center tap point 59 of an inductance 60 forming part of a parallel resonant circuit. The resonant circuit is completed by capacitor 62 connected in parallel with the inductance 60. The upper ends of the inductance 60 and the capacitor 62 are connected to a source of B plus potential.

The resonant circuit is tuned to 19 kc. so that only frequencies of 19 kc. and thereabouts are developed across the parallel resonant circuit. It is thus apparent that 19 kc. signals will be separated from the suppressed carrier signal and signals of other frequencies appearing at the output terminal 17*b*.

The parallel resonant circuit including the inductance 60 and the capacitor 62 will develop a constant amplitude sinusoidal 19 kc. voltage thereacross due to the presence of a constant amplitude synchronizing signal S2 when the signal fed to the synch-separator circuit 17 is a signal from a stereo-multiplex FM station. When the tuner 2 is not receiving an FM station, the noise signals present in the output of the tuner will shock excite the resonant circuit to produce the AM signal waveform S4 in FIG. 3 which has a time varying amplitude.

The bottom end of the inductance 60 of the resonant circuit is coupled by a capacitor 63 to the control grid 64 of a triode vacuum tube 66. The cathode 68 of the triode tube 66 is coupled through series connected resistors 70 and 72 to ground. A resistor 74 is connected between the control grid 64 and the juncture of resistors 70 and 72. The anode 76 of the triode tube 66 is coupled to a positive B plus potential source. The triode tube 66 and the associated circuit elements form a cathode follower circuit whose output is taken at the cathode connected end of resistor 70. The synch-separator circuit output terminal 17*a* is connected to this output point. The output terminal 17*a* of the cathode follower circuit is fed to the detector circuit 35 which effectively filters out any 19 kc. carrier freqeuncy leaving a voltage following the envelope of the 19 kc. signal fed thereto.

Figure 5:
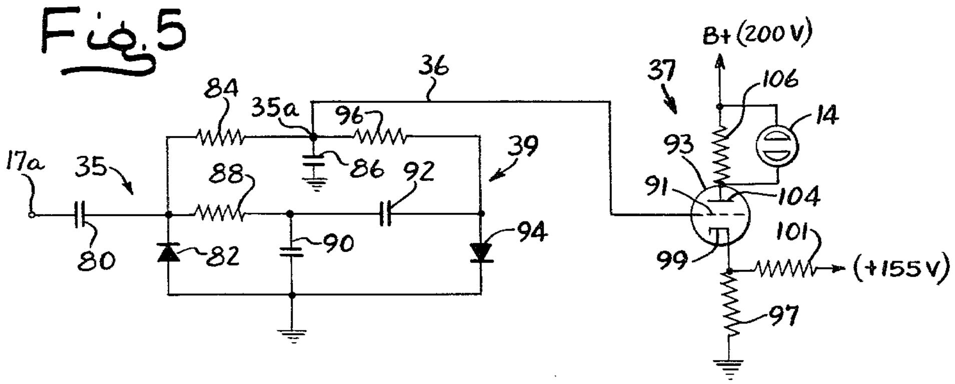
FIG. 5 is an exemplary circuit diagram of one form of stereo-light control circuit incorporating features of the present invention.
Figure 6:
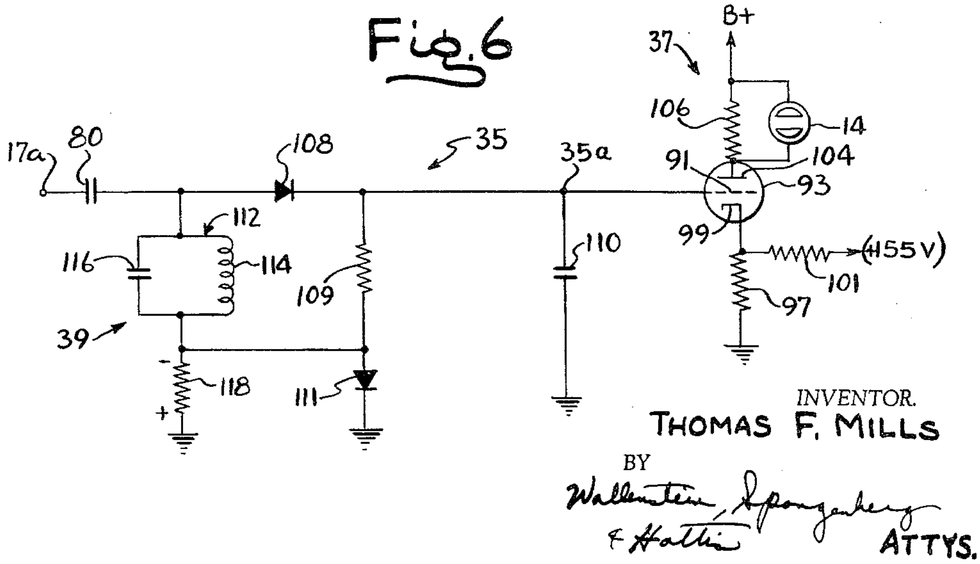
FIG. 6 is a circuit diagram of a stereo-light control circuit of the present invention constituting a substantial improvement over the circuit of FIG. 5.

Refer now to FIGS. 5 and 6 which show different exemplary circuit diagrams for the detector circuit 35 and the D.C. blocking and clamping circuit 39. The detector circuit 35 in FIG. 5 includes a capacitor 80 connected between the synch-separator output terminal 17*a* and the cathode electrode of a detecting rectifier 82. The anode electrode of the rectifier 82 is grounded. It is thus apparent that the voltage developed across the rectifier 82 will be the positive half of the 19 kc. signal coupled through the capacitor 80.

The detector circuit further includes a resistor 84 and a filter capacitor 86 connected in series in the order mentioned between the cathode electrode of the rectifier 82 and ground. It further includes another resistor 88 and a filter capacitor 90 coupled in series in the order mentioned between the cathode electrode of rectifier 82 and ground. The capacitors 86 and 90 will filter out any 19 kc. signal component leaving positive D.C. control voltages across the capacitors 86 and 90. The time constant of the circuit including resistor 88 and capacitor 90 is such that variations in the envelope of a noise induced 19 kc. signal appearing at the synch-separator output terminal 17*a* will appear across the capacitor 90, the 19 kc. carrier signal being bypassed thereby as above explained. This voltage will be a varying amplitude positive D.C. control voltage which is coupled through a capacitor 92 to the anode of a clamping rectifier 94 whose cathode is grounded. The capacitor 92 blocks the constant amplitude D.C. voltage present across the capacitor 90 when the input to the detector circuit is the constant amplitude synchronizing signal S2. Any varying amplitude D.C. control voltage developed across the capacitor 90 by noise induced 19 kc. signals is clamped by rectifier 94 to ground so that the resultant signal appearing across the rectifier 94 will be negative at all times. This negative voltage is coupled through a resistor 96 to the ungrounded end of the capacitor 86 and inhibits the presence of a positive voltage thereat which would operate the stereo-light 14.

The resultant voltage across the capacitor 86 is connected by the aforesaid output conductor 36 directly to the switch means 37 which, in FIG. 5, is the control grid 91 of a triode vacuum tube 93. The positive voltage resulting across the capacitor from the presence of a constant amplitude 19 kc. synchronizing signal will render the triode tube 93 highly conductive. This highly conductive state of the triode tube 93 is sometimes referred to as the first condition thereof. The triode tube 93 acts as a switch tube which is normally in a relatively low conductive state, which state represents what is sometimes referred to as the second condition of the circuit.

A resistor 97 is connected between the cathode 99 of the triode tube 93 and ground. The resistor 97 forms half of a voltage divider network including another resistor 101 connected in series with the resistor 97 at its point of connection to the cathode 99. The end of the resistor 101 remote from the cathode 109 is connected to a source of biasing potential which, in the illustrated embodiment of the invention, is 155 volts. The voltage divider network referred to provides a positive bias on the cathode, for example, in the order of 2.3 volts. This reduces the conduction of the triode tube substantially below said highly conductive state.

The anode 104 of the triode tube 93 is coupled through a resistor 106 to a source of positive B plug potential which is shown as 200 volts. The stereo-light 14 may be a neon light coupled across the resistor 106. When the triode tube 93 is in a relatively low conductive state, the voltage across the resistor 106 will not support a discharge in the neon light which will, therefore, be unlit. Upon the reception of a stereo-multiplex signal, the positive voltage fed by the conductor 36 to the control grid 91 will increase the conductivity of the triode tube 93 to a point where the voltage across the resistor 106 will light up the neon light 14.

Although the circuitry shown in FIG. 5 is satisfactory under certain restricted circumstances, it suffers from two main disadvantages. One disadvantage is that the arrangement of the circuit elements is such that maximum sensitivity to the noise produced signals is not achieved due to the voltage division action of the resistors 84 and 96. Another disadvantage of the circuit in FIG. 5 is that constant amplitude interference signals in the neighborhood of 19 kc. not substantially eliminated by the parallel resonant circuit of the synch-separator circuit can readily develop a D.C. control voltage which effects the lighting of the neon light 14, since no inhibiting voltage is developed with such a signal. It should be noted that some FM stations broadcast 20 kc. commercial shut-off signals which could readily cause such a false stereo-light indication.

These disadvantages are overcome by the improved circuit of FIG. 6 now to be described. As there shown, the detector circuit therein includes a detecting rectifier 108 whose anode electrode is connected to the input capacitor 80, a load resistor 109 connected to the cathode of the rectifier 108 and a filter capacitor 110 also connected to the cathode electrode of the rectifier 108. The plate of the capacitor 110 remote from the rectifier 108 is grounded and the end of the resistor 109 remote from the rectifier 108 is connected to the anode electrode of a ground connected clamping rectifier 111. As will appear, the rectifier 111 also forms part of the inhibit voltage generating circuit 39. The positive going portions of the signal coupled by the capacitor 80 will pass through the detecting rectifier 108 where it is applied across the load resistor 109 and the capacitor 110. Since a positive voltage will render the clamping rectifier 111 conductive, the bottom of the resistor 109 is effectively at D.C. ground potential for positive voltages. The capacitor 110 will filter out the carrier frequencies, leaving a D.C. voltage across the load resistor 109. The capacitor 110 in effect places A.C. ground at the upper end of resistor 109 and acts as a high impedance for D.C. The ungrounded side of the capacitor 110 is connected to the control grid 91 of the same triode tube 93 described in connection with FIG. 5. As previously indicated, in the absence of an inhibiting or opposing signal, this voltage will render the triode tube 93 highly conductive to energize the neon light 14.

The inhibit voltage generating circuit 39 is selectively responsive to varying amplitude 19 kc. signals or constant or varying amplitude signals different from 19 kc. by providing a varying amplitude control voltage across a load resistor 118 connected across the clamping rectifier 111. This circuit includes a high-Q parallel resonant circuit 112 tuned to 19 kc. and including an inductance 114 in parallel with a capacitor 116. One end of this resonant circuit is connected to the juncture of capacitor 80 and the detecting rectifier 108 and the other end is connected to the juncture of load resistor 109 and clamping diode 111. The parallel resonant circuit 112 is effectively bypassed for the positive going portions of the signals fed thereto through the capacitor 80, due to the conduction of the detecting rectifier and the low-impedance of capacitor 110 at the carrier frequencies.

However, the constant amplitude negative going portions of a 19 kc. signal will be substantially completely absorbed by the parallel resonant circuit. In the case where the signal fed to the input side of the resonant circuit is a varying amplitude 19 kc. signal or a signal of a different frequency from 19 kc., the negative envelope of the former signal and the instantaneous variations of the negative portion of the latter signal will appear as a negative voltage across the load resistor 118 due to the clamping action of the rectifier 111. The polarity of this voltage is in opposition to the polarity of the voltage developed across the load resistor 109 during the positive going portions of the input signal. The capacitor 110 will charge up to a voltage which is the resultant of these two voltages. The negative voltage developed across the load resistor 118 upon the presence of an input signal different than 19 kc. or upon a varying amplitude 19 kc. signal will reduce the voltage at the control grid of the triode tube 93 to a level which prevents the high conduction of the tube.

From a description of the circuit of FIG. 6, it should be apparent that the full magnitude of the negative envelope of a varying amplitude 19 kc. signal or a signal different from 19 kc. will appear across the load resistor 118. This circuit, therefore, is substantially more sensitive than the circuit of FIG. 5 and, unlike the latter circuit, even constant amplitude 20 kc. signals will develop an inhibiting voltage which prevents the false lighting of the neon light 14.

It should be understood that numerous modifications may be made in the preferred forms of the invention described above without deviating from the broader aspects of the invention. For example, it is apparent that the vacuum tube circuits disclosed in the drawings could be replaced by transistor circuits.

What I claim as new and desire to protect by Letters Patent of the United States is:

1. In a receiving system which includes control means which is to respond to a continuous constant amplitude signal of a first frequency and is to be non-responsive to other signals of a somewhat different frequency or noise signals of the same frequency which may be detected by the receiving system, said control means having a first condition indicating the reception of said constant amplitude signal and a second condition indicating the absence of such a signal and including means normally operating said control means in said second condition, the improvement comprising first resonant circuit means for separating signals at and near said first frequency from signals of a substantially different frequency therefrom, a detecting circuit responsive to the separated signals, said detecting circuit including rectifier, resistor and filter means for producing a D.C. control signal from the signals separated by said first resonant circuit means, means coupling said D.C. control signal to said control means to effect operation of said control means in said first condition in the absence of an inhibiting signal, and inhibit signal generating means for selectively generating an inhibiting signal which nullifies said D.C. control signal for varying amplitude signals of said first frequency and constant or varying amplitude signals of a somewhat different frequency which pass through said first resonant circuit means, said inhibit signal generating means comprising a second resonant circuit tuned to said first frequency for removing from the output thereof constant amplitude signals of said first frequency and clamping rectifier means coupled to said output for providing thereacross a second D.C. control voltage in opposition to said first-mentioned D.C. control voltage, said second D.C.. control voltage representing the envelope of a varying amplitude signal of said first frequency and the instantaneous variation of the rectifier portion of a constant ampiltude signal of a somewhat different frequency from said first frequency.

2. In a communication receiving system which is to be responsive to constant amplitude signals of a given frequency and unresponsive both to the absence of signals at or near said given frequency and the presence of varying amplitude signals of said given frequency, said system including frequency selective means for providing at a given output terminal signals at or near said given frequency, the improvement comprising: control means having control and ground connected terminals to which control signals are to be connected to provide a first condition indicating the reception of said constant amplitude signals and a second condition indicating the absence of such signals, biasing means normally operating said control means in said second condition in the absence of any signals at said output terminal, detector circuit means including rectifier means at the input of said detector circuit means coupled to said output terminal for blocking signals of one polarity, filter capacitor means coupled to said rectifier means for providing a point of A.C. ground and load impedance means coupled to said rectifier means across which impedance means the detected and filtered signal of one polarity appears, means coupling one side of said load impedance means to said control terminal of said control means, clamping rectifier means coupled between the other side of said load impedance means and ground for providing D.C. ground for signals of said one polarity at said other side of said load impedance means to operate said control means in said first condition when uninhibited detected signals are present across said load impedance means, and selective circuit means selectively responsive to the presence of said varying amplitude signals at said given output terminal and unresponsive to said constant amplitude signals by providing across said clamping rectifier means a ground clamped inhibiting voltage of a polarity opposite to said one polarity and which is in series opposition to the voltage across said load impedance to inhibit the effect thereof on said control means.

3. The receiving system of claim 2 wherein said selective circuit means is a parallel resonant circuit tuned to said given frequency and coupled between the input of said detector circuit means and the ungrounded end of said clamping rectifier means.

4. In a communication receiving system for selectively receiving ordinary FM signals from a number of different stations, and special FM signals from other stations each modulated by a constant amplitude signal component indicative of special accompanying FM signal components of a different frequency from said constant ampiltude signal component, the receiver system including an FM tuner section for demodulating the FM signals of the selected station, the FM tuner section including amplitude limiting means which reduces noise signals when an FM station signal is being received and passes appreciable noise signals when an FM station signal is not being received, and signal separation means coupled to the output of said tuner section for separating out any signal components having the frequency of said constant amplitude signal component from said other signal components of the demodulated signal, and supplying the separated signals to a given output terminal thereof, the improvement comprising a circuit responsive to the reception of the special FM signal, said circuit comprising: control means having a first condition indicating the reception of a special FM signal and a second condition indicating the absence of such a signal, said control means including a current control device having a control terminal which operates the control means in said first condition when the voltage between said control terminal and a reference point is of a first given polarity and has a magnitude in excess of a given magnitude, and is in said second condition when the voltage between said control terminal and said reference point is of opposite polarity or of said first polarity but of a lesser magnitude than said given magnitude, biasing means normally biasing said current control device to operate said control means in said second condition in the absence of any signal components at said output terminal wherein said control means will be in said second condition when said ordinary FM signals are being received, signal producing means responsive to the signal components at said output terminal by producing control signals having the shape of the envelope of the signal at said output terminal, the control signal being steady D.C. control signals where constant amplitude signal components are present and varying amplitude control signals where appreciable noise signals are present, said signal producing means including a detecting rectifier and a first impedance across which said constant and varying amplitude signals appear with a consistent polarity, the steady D.C. control signals produced by said signal producing means being of said first polarity and having a magnitude in excess of said given magnitude, said signal producing means further including a signal input terminal, said detecting rectifier connected in series between said input terminal and said first impedance to pass voltages of only one polarity thereto, a filter capacitor coupled between the rectifier connected end of said first impedance and said reference point for bypassing relatively high frequency components from said first impedance, first circuit means coupling the voltage across said filter between the control terminal of said current control device and said reference point to produce thereat in the absence of an inhibit signal a resultant signal of said first polarity in excess of said given magnitude, a parallel resonant circuit tuned to said first frequency and coupled between said input terminal and the end of said first impedance remote from said detecting rectifier, a clamping rectifier connected to said reference point and across which said varying amplitude signal is applied, said clamping rectifier acting to clamp the varying amplitude signal to said reference point, and connecting means coupling the voltage developed across the clamping rectifier in opposing relation to the voltage developed across said first impedance, to reduce the resultant signal fed to said control terminal below said given magnitude.

5. In a communication receiving system for selectively receiving ordinary FM signals from a number of different stations, and special FM signals from other stations each modulated by a constant amplitude signal component indicative of special accompanying FM signal components of a different frequency from said constant amplitude signal component, the receiver system including an FM tuner section for demodulating the FM signals of the selected station, the FM tuner section including amplitude limiting means which reduces noise signals when an FM station signal is being received and passes appreciable noise signals when an FM station signal is not being received, and signal separation means coupled to the output of said tuner section for separating out any signal components having the frequency of said constant amplitude signal component from said other signal components of the demodulated signal, and supplying the separated signals to a given output terminal thereof, the improvement comprising a circuit responsive to the reception of the special FM signal, said circuit comprising: control means having a first condition indicating the reception of a special FM signal and a second condition indicating the absence of such a signal, biasing means normally operating said control means in said second condition in the absence of any signal components at said output terminal wherein said control means will be in said second condition when said ordinary FM signals are being received, signal producing means responsive to the signal components at said output terminal by producing control signals having the shape of the envelope of the signals at said output terminal, the control signals being steady D.C. control signals where constant amplitude signal components are present and varying amplitude control signals when appreciable noise signals are present, first circuit means responsive to said control signals in the absence of an inhibiting signal by effecting the operation of said control means in said first condition, and inhibit signal circuit means selectively responsive to varying amplitude control signals by providing inhibiting signals which nullify the effect of said first circuit means on said control means to maintain said second condition thereof, said inhibit circuit means including tuned circuit means for filtering out any signal having the frequency of said constant amplitude signal from the output thereof, but leaving other demodulated constant and varying amplitude signals acting as varying amplitude control signals.

References Cited by the Examiner

UNITED STATES PATENTS

| | | | |
|---|---|---|---|
| 2,422,976 | 6/1947 | Nicholson | 325—478 |
| 2,678,384 | 5/1954 | Beers | 325—348 |
| 2,914,664 | 11/1959 | Paul | 179—15 |
| 3,125,641 | 3/1964 | Von Recklinghausen | 179—15 |
| 3,128,437 | 4/1964 | Loughlin | 179—15 |

OTHER REFERENCES

Mergner: "Product Detector for FM-Stereo," Audio, August 1961, pages 23–25 and 102 relied on.

DAVID G. REDINBAUGH, *Primary Examiner.*